US008170713B2

(12) United States Patent
Levasseur et al.

(10) Patent No.: US 8,170,713 B2
(45) Date of Patent: May 1, 2012

(54) METHOD OF SELECTING A PRODUCT FROM A REFRIGERATED GLASS FRONT VENDING MACHINE

(75) Inventors: Joseph Levasseur, Chesterfield, MO (US); Mark Leibu, St. Louis, MO (US)

(73) Assignee: Coin Acceptors, Inc., St. Louis, MO (US)

( * ) Notice: Subject to any disclaimer, the term of this patent is extended or adjusted under 35 U.S.C. 154(b) by 354 days.

(21) Appl. No.: 12/399,653

(22) Filed: Mar. 6, 2009

(65) Prior Publication Data

US 2009/0228142 A1 Sep. 10, 2009

Related U.S. Application Data

(60) Provisional application No. 61/034,483, filed on Mar. 6, 2008.

(51) Int. Cl.
*G06F 17/00* (2006.01)

(52) U.S. Cl. ......... 700/232; 700/242; 221/155; 345/173

(58) Field of Classification Search .................. 221/155; 345/156, 173; 700/232, 236, 242
See application file for complete search history.

(56) References Cited

U.S. PATENT DOCUMENTS

| | | | | |
|---|---|---|---|---|
| 5,831,862 | A * | 11/1998 | Hetrick et al. | 700/232 |
| 7,176,902 | B2 * | 2/2007 | Peterson et al. | 345/173 |
| 7,218,991 | B2 * | 5/2007 | Walker et al. | 700/232 |
| 7,315,300 | B2 * | 1/2008 | Hill et al. | 345/173 |
| 7,593,005 | B2 * | 9/2009 | Bayramoglu | 345/177 |
| 7,683,890 | B2 * | 3/2010 | Geaghan | 345/173 |

* cited by examiner

*Primary Examiner* — Timothy Waggoner
(74) *Attorney, Agent, or Firm* — Polster Lieder Woodruff & Lucchesi, L.C.

(57) ABSTRACT

An improved method and apparatus for selection of vendible products provides designated product reference areas at a refrigerated double glass front vending machine for making viewable product selections thereon by applying a light tap at its outer glass pane and sensing the tap location by three or more spaced apart resilient members each having its first portion attached at the inner glass pane. The resilient member's second portion suspends an inertia mass that reciprocates at a predetermined rate due to the inertia mass weight and the resiliency of the suspending member. A sensor senses the reciprocating movement in response to the light tap. The location of the tap is determined by measuring the arrival time of each predetermined signal produced by the first resonating alternation of its attached resiliently suspended inertia mass during the first rearward movement of the inner glass pane.

15 Claims, 5 Drawing Sheets

FIG. 13A
FIG. 13B
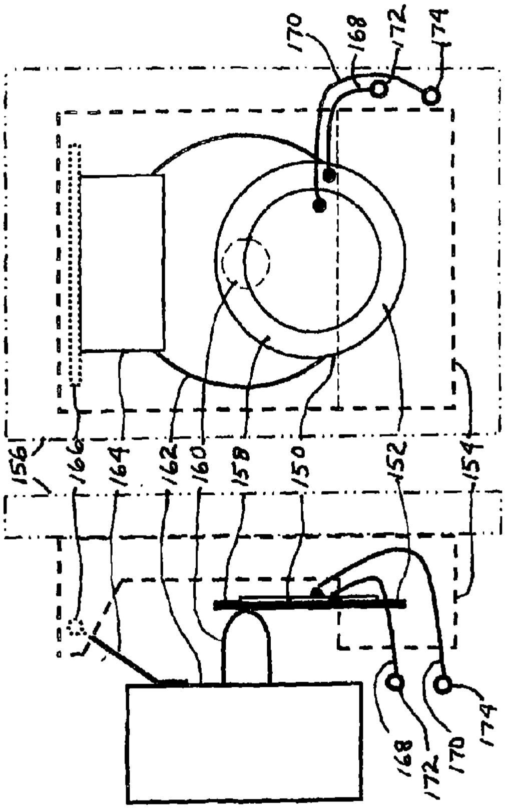
FIG. 14A
FIG. 14B
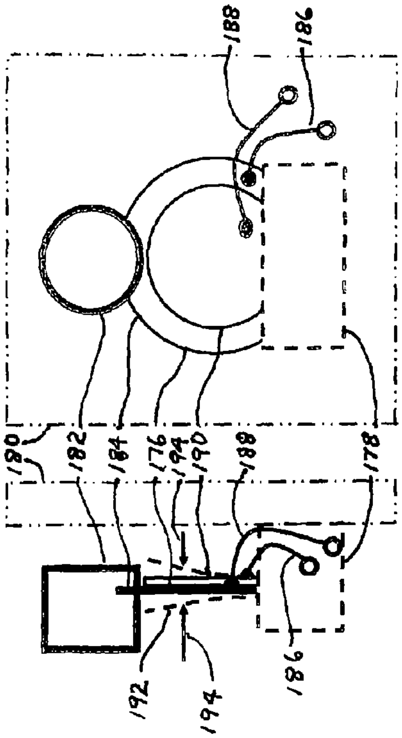
FIG. 5
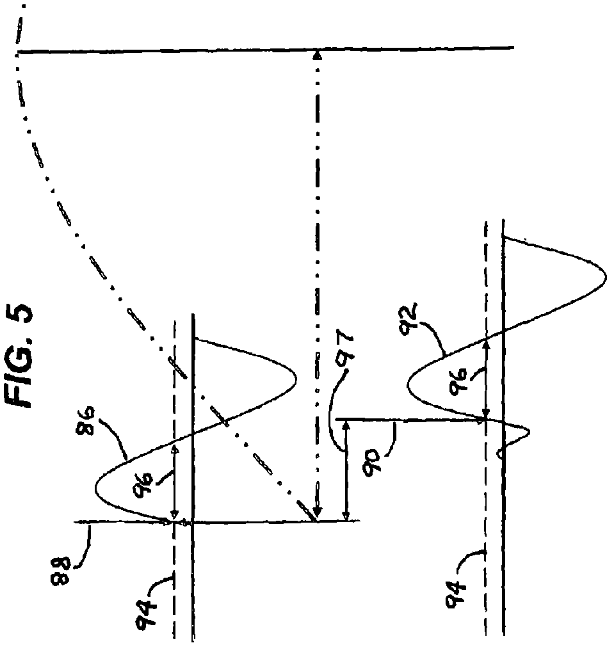
FIG. 6
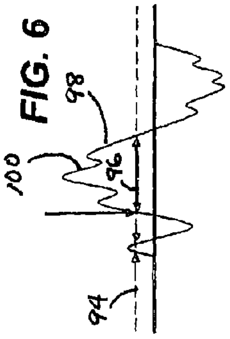

METHOD OF SELECTING A PRODUCT FROM A REFRIGERATED GLASS FRONT VENDING MACHINE

CROSS-REFERENCE TO RELATED APPLICATIONS

The present application claims priority to Provisional Application Ser. No. 61/034,483, filed on Mar. 6, 2008. The contents of this application are incorporated herein by reference.

FIELD OF THE INVENTION

The viewing of selectable products from within a refrigerated glass front vending machine typically include two spaced apart transparent glass panes for providing thermal insulation. The customer selects from among the designated viewable products by depressing designated selection buttons located off to one side of the viewing area, and having entered sufficient credit for the selection receives the vended product.

BACKGROUND OF THE INVENTION

A customer enters the identification associated with one of the many viewable products within a glass front vendor and makes a two digit entry on a keypad or selection buttons located away from the viewed products. Many different selection methods are used to select products from a vending machine, ranging from depressing alpha-numeric marked buttons that activate sensors, to the touching of identified areas on a screen or panel.

Many known technologies for identifying areas of touch on a screen could be utilized such as Acoustic Pulse Recognition (APR) which comprises a glass display overlay or other rigid substrate, with four piezoelectric transducers mounted on the back surface. The transducers are mounted on two diagonally opposite corners out of the visible area and connected via a flex cable to a controller card. The impact when the screen is touched, or the friction caused while dragging between a user's finger or stylus and the glass, creates an acoustic wave. The wave radiates away from the touch point, making its way to the transducers which produce electrical signals proportional to the acoustic waves. These signals are amplified in the controller card and then converted into a digital stream of data. The touch location is determined by comparing the data to a profile. The APR is designed reject ambient and extraneous sounds, as these do not match a stored sound profile. The key is that a touch at each position on the glass generates a unique sound. Four tiny transducers attached to the edges of the touch-screen glass pick up the sound of the touch. The sound is then digitized by the controller and compared to a list of prerecorded sounds for every position on the glass. The cursor position is instantly updated to the touch location. By using the sound generated when a finger or stylus touches the glass, APR allows users to touch the screen with practically anything, such as a fingernail, gloved hand, pen or corner of credit card.

Dispersive Signal Technology (DST) represents a fundamentally different approach to touch. Unlike other solutions that recognize touch by the interruption of electrical fields, acoustic waves, optical fields, or infrared light, Dispersive Signal Technology recognizes touch by interpreting bending waves created in the overlay substrate via the impact of a touch. DST locates sensors in each corner of the touch screen, which measure the vibration energy. Advanced dispersion adjustment algorithms are then applied to the data, allowing accurate reporting of each touch. This approach helps eliminate issues with screen contaminants and surface scratches, and also allows a touch to be registered while a palm and/or object is resting on the screen's surface. A finger, gloved hand or stylus can initiate a touch while a person's palm and drink are on the surface. The touch creates a vibration, which radiates a bending wave through the substrate from the point of contact spreading out to the edges, and the resting items are ignored as they do not generate any vibration energy.

An established technology using waves to detect contact is Surface Acoustic Wave (SAW), which generates high frequency waves on the surface of a glass screen, and their attenuation by the contact of a finger, is used to detect the touch location. This technique is "time-of-flight", where the time for the disturbance to reach one or more sensors is used to detect the location. Such an approach is possible when the medium behaves in a non=dispersive manner i.e. the velocity of the waves does not vary significantly over the frequency range of interest. A contact sensitive device comprising a member capable of supporting bending waves, having a plurality (e.g. three or more) sensors mounted on the member for measuring bending wave vibration in the member, whereby each sensor determines a measured bending wave signal. A processor calculates a location of a contact on the member from the measured bending wave signals, in that the processor calculates a phase angle for each measured bending wave signal, and then calculates a phase difference between the phase angles of least two pairs of sensors from which the location of the contact is determined. Ultrasonic acoustic wave contact detecting apparatuses are in widespread use. Examples of their applications include operating screens of personal computers, ticket dispensers at train stations, copiers installed in convenience stores and ATM's at financial institutions. These acoustic wave contact detecting apparatus utilize transducers, including piezoelectric vibrators provided on a substrate (touch panel) formed of glass or the like. These transducers function both as generating means for bulk waves and as sensors for detecting acoustic waves which are scattered by a finger or the like that contacts the touch panel. The surface acoustic waves are scattered by a finger or the like. The scattering of the surface acoustic waves is detected by detection means. The detected signal is referenced against a clock signal of a controller, and the position at which the surface acoustic waves are scattered is determined.

Another method for locating the positions of fingers knocking on a pane of glass is Acoustic Tap Tracking (ATT). The finger tap excitation can change considerably from one hit to the next. Variations occur depending on how the glass is struck, the type of glass used, and how the glass is supported. Contact pickups made of polyvinylidene fluoride (PVDF) piezoelectric foil 52, are placed near the perimeter of a glass pane produce signals when the glass is hit. They are bonded with common adhesive to a glass window solidly supported by rubber anchors along its entire perimeter. To track taps more reliably, using a simple static threshold is generally not adequate. Amplitude dependence is one factor, because the leading edge for a knuckle-tap is not sufficiently abrupt. The characteristics of the first arrival can vary widely from transducer to transducer and impact to impact. A significant problem posed by the variable amount of low-amplitude, higher-frequency, dispersive deflection often arrives before the main wavefront. Likewise, sharp impacts (e.g., snapping a metal ring against the glass instead of one's knuckle) excite rapidly moving modes. A microcontroller continuously digitizes the analog signals, from four transducers into 10 bits at over 10 kHz enables a more detailed and robust embedded analysis to look at other waveform features (e.g., peak amplitudes and waveform shape) for each tap. The microcontroller continuously samples the signals from each transducer into a rotating buffer. Upon detecting a transducer signal above a noise threshold, a "knock" event is declared, and 10 millisecond (ms) worth of data are stored from all four inputs (including 3 ms of data before the trigger occurs). This buffer is then scanned for every significant peak in the absolute-value waveform produced by each transducer, and descriptive parameters (e.g., peak height, width, and mean arrival time relative to the initial trigger) are extracted for each peak including any small peaks arriving earlier. These parameters are sent, together with a count of the number of zero-crossings across the data acquisition interval (too many zero crossings indicate a sharp hit with different timing). A connected personal computer then processes the timing determined for each first peak by a second order polynomial that was obtained from a linear least-squares fit to a set of calibration to produce an estimate of the impact location in Cartesian coordinates. In addition to increasing the reliability of the results, the use of a microcontroller readily enables more channels of gestural input (e.g., measuring the strike intensity and classifying the type of strike). Also extracted is an estimate of accuracy or validity by crosschecking the detected waveform characteristics from the different sensors and examining the differences between the four position estimates obtained from the four different sensor triplets (since there are four pickups, there is one redundant degree of freedom). The sensor strips are very small and do not significantly block the window's view.

The present invention provides a simple method to utilize the typical double glass pane construction of a refrigerated glass front vending machine for making product selections on the glass front without modifying the glass panes or their support, and without requiring sensors on the outer glass pane. It does not require the generation of high frequency waves, nor does it utilize the high frequency sounds from the touching of the outer glass pane.

SUMMARY OF THE INVENTION

This invention provides an improved vending machine apparatus and method for selecting viewable products through its glass front pane by applying a light tap at the relative product designation on the glass front pane. The designations are positioned relative to the products and require only one light tap of the finger to make the product selection, and without having to look away from the viewable product. The method provides a simple and effective way to determine a product selection at a typical refrigerated glass front vending machine having two spaced apart glass panes without requiring any apparatus at the outer glass pane. No changes are required for the glass panes, their mounting, and insulation design. A single light tap by the customer at the product designation on the outside glass pane transfers the lateral movement rearward to the inner glass pane through the insulated space there between and causes three or more spaced apart and resiliently suspended inertia masses to develop their unique rate of movement which are sensed and provide outputs which are used to determine the product selected.

Thus according to one aspect of the invention there is provided a method of vending a viewable product within a refrigerated, double glass front vending machine comprising the steps of: (a) detecting a light tap by a customer on a selectable product reference area on the outer glass pane area by use of at least three or more spaced apart piezo discs with their resilient first portions attached to the inner glass pane and oriented in the same general plane therewith; (b) providing a suspended inertia mass attached to each of the piezo discs resilient second portions; (c) monitoring the resultant signals produced when the inner glass pane area is first moved rearward from its rest position and in respect to the suspended inertia mass movement and the resilient piezo disc attached first portions; (d) determining the arrival times of said signals; (e) comparing the arrival time intervals between the at least three sensors to the acceptable arrival time intervals stored in memory for each product reference area; (f) determining the selected product reference area; (g) determining the selected product and its value; (h) determining that the amount credited to the customer at least equals the selected product value; (i) vending the product selected; and (j) refunding any over credited amounts.

According to yet another aspect of the invention there is provided a method of vending a viewable product within a refrigerated, double glass front vending machine comprising the steps of: (a) detecting a light tap by a customer on a selectable product reference area on the outer glass pane area by use of three or more spaced apart resilient members with their first portions attached about the inner glass pane and with a suspended inertia mass at its unattached second portion; (b) sensing the relative movement between the suspended inertia mass and the resilient member attached first portions, using piezo, resistive, capacitive, inductive, or optical sensors; (c) monitoring the resultant sensor signal produced when its inner glass pane area is first moved rearward from its rest position and in respect to the movement of its suspended inertia mass; (d) determining the arrival times of the sensor signals; (e) comparing the arrival time intervals between at least three sensors to the acceptable arrival time intervals stored in memory for each product reference area; (f) determining the selected product reference area; (g) determining the selected product and its value; (h) determining that the amount credited to the customer at least equals the selected product value; (i) vending the product selected; and (j) refunding any over credited amounts.

According to yet another aspect of the invention there is provided a method of vending a viewable product within a refrigerated, double glass front vending machine comprising the steps of. (a) detecting a light tap by a customer on a selectable product reference area on the outer glass pane area by use of three or more spaced apart resilient members with first portions attached about the inner glass pane, each with a suspended inertia mass at its unattached second portion; (b) providing a suspended inertia mass and resilient member combination that resonates at a selected rate faster than the natural inner glass pane's lateral movement (c) sensing the relative movement between the suspended inertia mass and the resilient member attached first portion, using piezo, resistive, capacitive, inductive, or optical sensors; (d) monitoring the resultant sensor signal produced when its inner glass pane area is first moved rearward from its rest position and in respect to the movement of its suspended inertia mass; (e) determining the arrival times of said signals; (f) comparing the arrival time intervals between at least three sensors to the acceptable arrival time intervals stored in memory for each product reference area; (g) determining the selected product reference area; (h) determining the selected product and its value; (i) determining that the amount credited to the customer at least equals the selected product value; (j) vending the product selected; and (k) refunding any over credited amounts.

According to yet a further aspect of the invention there is provided a method of vending a viewable product within a refrigerated, double glass front vending machine comprising the steps of: (a) detecting a light tap by a customer on a selectable product reference area on the outer glass pane area by use of three or more spaced apart resilient members with first portions attached about the inner glass pane, each with a suspended inertia mass at its unattached second portion; (b) providing a suspended inertia mass and resilient member combination that resonates at a selected faster rate than the natural inner glass pane's lateral movement (c) sensing the relative movement between the suspended inertia mass and the resilient member attached first portion, using piezo, resistive, capacitive, inductive, or optical sensors; (d) monitoring the resultant sensor signal produced when the inner glass pane is first moved rearward from its rest position and in respect to the movement of its suspended inertia mass; (e) identifying the first alternation of each suspended inertia mass to determine the arrival times of said signals; (f) comparing the arrival time intervals between at least three sensors to the acceptable arrival time intervals stored in memory for each product reference area; and (g) communicating the selected product to a microprocessor.

According to yet a further aspect of the invention there is provided a method of vending a viewable product within a refrigerated, double glass front vending machine comprising the steps of (a) detecting a light tap by a customer on a selectable product reference area on the outer glass pane area by use of three or more spaced apart resilient members with first portions attached about the inner glass pane, each with a suspended inertia mass at its unattached second portion; (b) providing a suspended inertia mass and resilient member combination that resonates at a selected faster rate than the natural inner glass pane's lateral movement (c) sensing the relative movement between the suspended inertia mass and the resilient member attached first portion, using piezo, resistive, capacitive, or optical sensors; (d) monitoring the resultant sensor signal produced when the inner glass pane is first moved rearward from its rest position and in respect to the predetermined movement of its suspended inertia mass; (e) identifying a designated threshold level of the first alternation of each suspended inertia mass to determine the arrival times of said signals; (f) comparing the arrival time intervals between at least three sensors to the acceptable arrival time intervals stored in memory for each product reference area; and (g) communicating the selected product to a microprocessor.

According to yet a further aspect of the invention there is provided a method of vending a viewable product within a refrigerated, double glass front vending machine comprising the steps of: (a) detecting a light tap by a customer on a selectable product reference area on the outer glass pane area by use of at least three space located apart resilient members on the inner glass pane, having their first portions attached thereto, and each with a suspended inertia mass at its unattached second portion; (b) providing a suspended inertia mass and resilient member combination that favors the direction of the inner glass pane's natural lateral movement but designed to resonate at a faster rate (c) sensing the relative movement between the suspended inertia mass and the attached resilient member's first portion, using piezo, resistive, capacitive, or optical sensors; (d) monitoring the resultant sensor signal produced when the inner glass pane is first moved rearward from its rest position and in respect to the movement of its suspended inertia mass; (e) identifying a designated threshold level of the first alternation of each suspended inertia mass to determine the arrival times of said signals; (f) comparing the arrival time intervals between at least three sensors to the acceptable arrival time intervals stored in memory for each product reference area; and (g) communicating the selected product to a microprocessor.

According to yet a further aspect of the invention there is provided a method of indicating a viewable item within a glass front vending machine comprising the steps of. (a) detecting a light tap by a customer on a selectable product reference area on the glass pane area by use of at least three space located apart resilient members having their first portions attached thereto, and each with a suspended inertia mass at its unattached second portion; (b) providing a suspended inertia mass and resilient member combination that favors the glass pane's natural lateral movement but resonates at a faster rate (c) sensing the relative movement between the suspended inertia mass and the resilient member attached first portion, using piezo, resistive, capacitive, inductive, or optical sensors; (d) monitoring the resultant sensor signal produced when the glass pane is first moved rearward from its rest position and in respect to the movement of its suspended inertia mass; (e) identifying a designated threshold level of the first alternation of each suspended inertia mass to determine the arrival times of said signals; (f) comparing the arrival time intervals between at least three sensors to the acceptable arrival time intervals stored in memory for each product reference area; and (g) communicating the selected item.

According to yet a further aspect of the invention there is provided a method of indicating a viewable item within a glass front vending machine comprising the steps of. (a) detecting a light tap by a customer on a selectable product reference area on the glass pane area by use of three or more spaced apart resilient members having their first portions attached thereto, and each with a suspended inertia mass at its unattached second portion; (b) providing a suspended inertia mass and resilient member combination that favors the glass pane's natural lateral movement but resonates at a faster rate; (c) providing a suspended inertia mass and resilient member combination that is resilient enough to resist responding to the glass movements that are less than the expected light tap of a finger and to oscillate the suspended inertia mass when it equals or exceeds it; (d) sensing the relative movement between the suspended inertia mass and the resilient member attached first portion, using piezo, resistive, capacitive, inductive, or optical sensors; (e) monitoring the resultant sensor signal produced when the glass pane is first moved rearward from its rest position and in respect to the movement of its suspended inertia mass; (f) identifying a designated threshold level of the first alternation of each suspended inertia mass to determine the arrival times of said signals; (g) comparing the arrival time intervals between at least three sensors to the acceptable arrival time intervals stored in memory for each product reference area; and (h) communicating the selected item.

BRIEF DESCRIPTION OF THE DRAWINGS

FIG. 5 is a drawing depicting output signals from two sensors arriving at two different times, and shown in relationship to the inner glass pane movement;

FIG. 6 is a drawing depicting a sensor output signal that may be altered by a superimposed glass pane movement while that developed by the predetermined resilient suspended inertia mass;

FIGS. 13A and 13B are sketches showing the cross sectional side and front views, respectively, of a piezo disc sensor having its first portion attached to a glass pane and its unattached second portion pressed against by an separately suspended inertia weight;

FIGS. 14A and 14B are sketches showing the cross sectional side and front views, respectively, of a resilient member of a piezo disc with its first portion attached to a glass pane and its second portion having an inertia weight affixed thereto.

DETAILED DESCRIPTION OF THE INVENTION

Referring to the figures there is generally illustrated therein a preferred embodiment of a glass front vending machine that incorporates the principles of this invention. While the preferred embodiment of this invention will be described with its applicability to a glass front vending machine for refrigerated products, it will be understood that the broad principles of the invention are not limited to such product selection application or to the specifics of the preferred embodiment disclosed. The described disclosure represents one clear example of a selection system incorporating the principles of the claimed invention, but the invention is not intended to be construed in a limiting manner as a result of the preferred embodiment disclosure.

Figure 1:
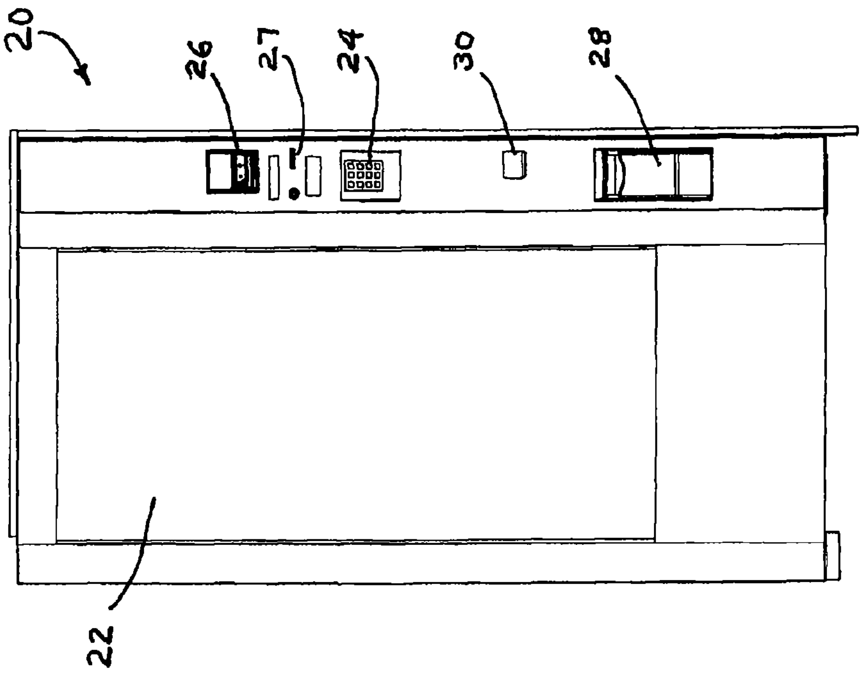
FIG. 1 is a front view of a refrigerated glass front vending machine door showing a typical placement of components for a customer to view, deposit credit for, select, and receive a vended product.

Referring now to FIG. 1, there is generally illustrated a glass front vending machine 20, with its glass front 22 for viewing the available identified products for selection, the keypad 24 for making a double digit entry of the selected product, the credit entry portion 26 for depositing bills and/or credit cards, the coin entry portion 27, and its product delivery port 28. The coin return 30 provides the location for coin refunds to be made. The customer typically determines the available products by viewing them through the glass front 22 and determines the double digit product identifier and then looks over to the keypad 24 and depresses the appropriate two keys in proper succession. If the amount of credit he has deposited at the credit entry portion 26 at least equals the value assigned to the product he has selected, then the vending machine transfers the product to the customer to the delivery port 28.

Figure 2:
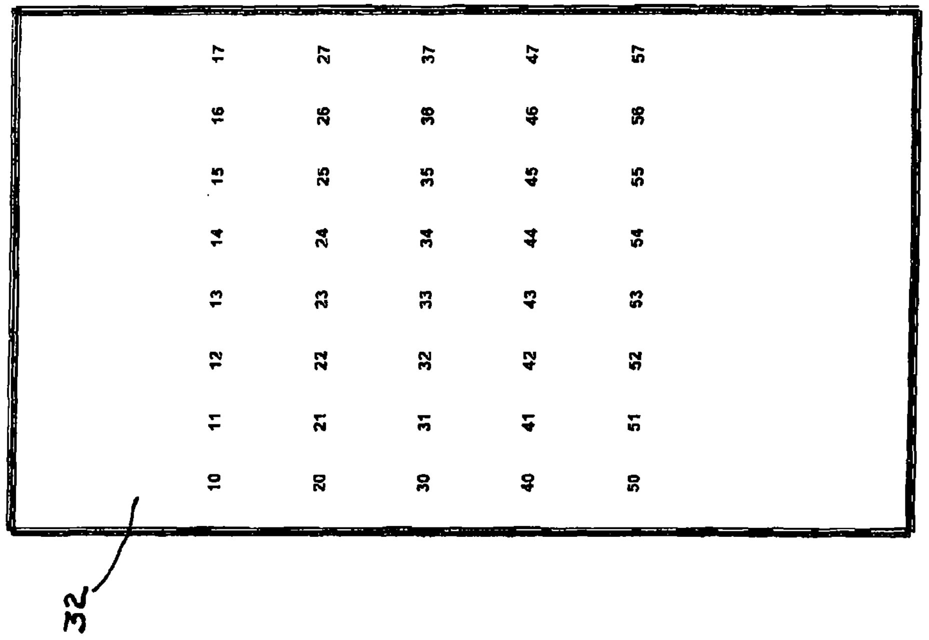
FIG. 2 is a front view of a preferred embodiment showing the glass front of a vendor with product designations located thereon and in relationship to products visible therein.

Referring now to FIG. 2 wherein is depicted a front view of a glass front pane 32 with double digit product references placed thereon for a customer to select by a single light tap. Eight product references are shown arranged in the top row beginning with the product identifiers 10 thru 17, and down to the last row marked 50 through 57.

Figure 3A:
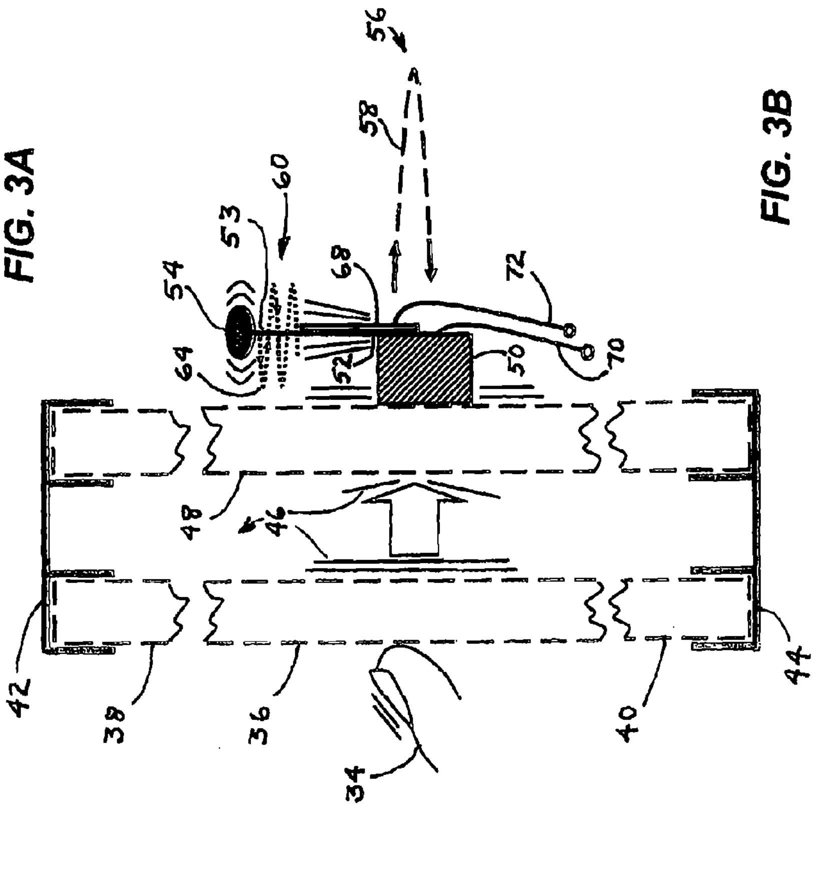
FIG. 3A is a diagrammatic cross sectional side view depicting the natural lateral movement of the two spaced apart glass panes when a tap occurs, and the interaction with a resilient suspended inertia mass shown with dashed tracings depicting the movements.

A cross sectional side view in FIG. 3A depicts a double pane glass front with a finger 34 applying a light tap at the outer glass pane 36 with its upper end 38 and lower end 40 secured by the upper frame 42 and lower frame 44, respectively. The glass pane 36 is approximately 50 inches high by 24 inches wide. When the tap occurs, the resilient outer glass pane 36 moves back away from the applied tap and presses against the inert gas 46 sealed between the outer glass pane 42 and the spaced behind inner glass pane 48. The resultant pressing of the sealed inert gas 46 causes the inner glass pane 48 to begin to move rearward (away) beginning directly behind the tap location and moving outwardly from that point. For purposes of illustration there is shown an attachment 50 to the inner glass pane 48 right in line with the tap coming from the finger 34 which is then abruptly moved rearward (away) and has attached to it the lower portion of a resilient member 52, having its upper portion 53 attached with an inertia mass 54. The inertia mass 54 characteristic tendency to remain in its present state causes the resilient member 52 to flex in overcoming the inertia mass. While the inner glass pane 48 is in the process of its rearward movement from the tap, the rate of deflection of the inertia mass and its energy storing resilient member 52 is designed to oscillate more than once during the rear inner glass pane 48 movement from its rest position, to its furthest rearward position. The rate of oscillation of the inertia mass 54 provides a distinguishable signal from others that may occur with various tap types, locations and magnitudes thereof. The rearward movement of the inner glass pane 48 and the attachment 50 is depicted moving away and returning back through its initial position by the tracing 56. During the reward movement shown by the tracing 56, portion 58, the imparted movement through the resilient member 52 with its suspended inertia mass 54 causes its oscillation to occur more than once during that time as depicted at the tracing 60. In this preferred embodiment there is utilized a piezo sensor comprised of its resilient member 52 and the piezo element 68. Wires 70 and 72 provide the connection for the piezo sensor output signal developed by the inertia mass 54 with its resilient member 52. It is very important to note that the resilient member 52 should be resilient enough to resist the glass movements that are less than the expected light tap of a finger and respond to the light tap to oscillate the suspended inertia weight. This eliminates most of the unnecessary vibrations that may occur, and utilizes the primary tap energy to operate the resiliently suspended inertia mass.

Figure 3B:
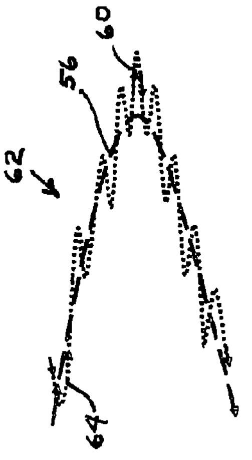
FIG. 3B is a sketch of the glass front and inertia mass movements of FIG. 3A, superimposed.

In FIG. 3B the tracings 56 and 60 are shown in a combined tracing 62. The indication of the very first predetermined rate of oscillation of the inertia mass 54 in FIG. 3A, is the alternation 64 of the tracing 60, shown also in FIG. 3A.

In the present invention the initial sounds produced within and around the outer glass pane by a tap are somewhat isolated from the spaced apart inner glass pane by the space between them. The two rectangular glass panes are sealed and suspended at their outer edge. The rate of natural lateral movement of the edge supported inner glass pane of a typical refrigerated glass front vending machine may occur in the vicinity of 60 to 100 times per second, whereas the frequency of the sounds produced by an initial impact within and about the surface of the outer glass pane can range up to thousands of times per second. An applied perpendicular tap causes the glass pane to bend away (backward) from the applied tap and then return (forward) at its natural lateral movement rate, which is primarily dependant on the glass pane dimensions, thickness, resilience and edge mounting. A further variable can be attributed to the location of the tap, as well as the temperature of the glass pane. Using an assumed rate of 70 times a second, with a time period of about 14 ms (milliseconds), the total time of its bending backward from rest position would be approximately 7 ms and the total time of bending forward would also be approximately 7 ms.

The majority of the energy imparted by a tap to the outer glass pane is generally perpendicular to it and provides a resulting natural glass flexing movement. In the preferred embodiment the initial rearward deflection caused by the tap is transferred to the inner glass pane having a number of spaced apart piezo sensors affixed thereto, each with a suspended inertia mass and its resilient disc as its reference. The piezo sensors each produce a signal caused by the initial lateral glass movement connected to its first portion in relationship to its reference mass attached to its second portion. The initial motion is stored in the flexing of the piezo's resilient disc relative to its suspended reference mass and provides a reciprocating rate established by the mass and the flexing of the resilient piezo disc. The reciprocating rate is designed to further differentiate from other glass pane movements that may occur.

An object at rest tends to remain at rest, and an object in motion tends to remain in motion (in a straight line). This is also known as the law of inertia. A change in state (rest, or motion) is called acceleration a, which is proportional to the net force $F_{net}$ applied to the An object at rest tends to remain at rest, and an object in motion tends to remain in motion (in a straight line). This is also known as the law of inertia. A change in state (rest, or motion) is called acceleration a, which is proportional to the net force $F_{net}$ applied to the object from outside: $F_{net}$=m a. The proportionality "constant" m is what physicists call mass. For every action (a force applied to an object from the outside) there is always an equal-and-opposite reaction (the object pushes back on whatever pushed on it).

Newton's Second Law essentially defines mass: it is the numerical size of an object's inertia; that intrinsic property of matter which makes it resist to being accelerated. The more mass an object has, the less acceleration it will have when pushed or pulled by a given size of force. The amount of mass is a measure also of the quantity of matter that makes up an object. The more mass (more matter) in an object, the harder it is to get it moving and the harder it is to stop it once it is moving. The translational inertia is just another name for mass. We can define translational inertia, m, as follows: translational inertia, m, is a measure of an object to a change in its motion.

Figure 4A:
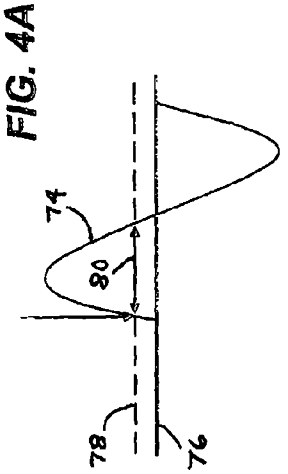
FIGS. 4A, 4B, and 4C are drawings of typical output signals from a sensor detecting the interaction of a resiliently suspended inertia mass when a light tap occurs on the glass pane when it is nearby, about the middle, and beyond the middle.
Figure 4B:
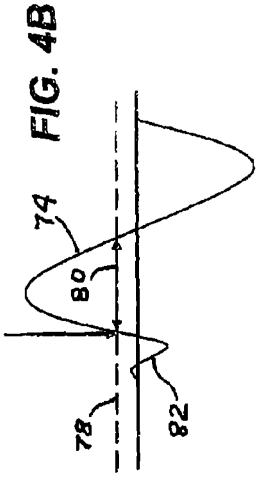
Figure 4C:
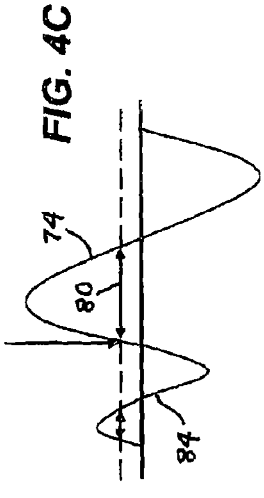

Referring to FIG. 4A showing the predetermined typical waveform 74 from a sensor when a tap occurs within about two or three inches from its suspended inertia mass. The waveform begins at the zero reference point 76 and goes above the threshold level 78 for a predetermined time indicated by arrows 80. The returning of the inertia mass by its resilient support begins the oscillation to develop into sinusoidal wave shapes which continue (not shown) during the initial rearward movement of the glass pane when lightly tapped. Represented in FIG. 4B is the predetermined typical waveform 74 when the tap occurs about part way across from the sensor. The duration above threshold level 78 shown by arrows 80 is the same as in FIG. 4A, but it is preceded by a sine wave 82 of lesser amplitude and duration. Represented in FIG. 4C is the predetermined typical waveform 74 when the tap occurs across at the opposite side of the glass pane. The preceding sine wave 84 is greater but never the predetermined duration of that produced by the resiliently suspended inertia mass. When a tap occurs from a distance from the sensor, the warping movement of the glass due in response to the tap travels faster and is of a shorter duration than the natural lateral movement of the edge mounted glass pane. A preferred embodiment of this invention employs a predetermined inertia duration that is shorter than the natural glass lateral movement, but longer than the glass pane warping durations. For example, the duration of the glass pane extending away from the tap and returning back to rest position (an alternation) may be about 7 milliseconds. A completed cycle which includes the returning fully toward the tap and back to point of rest would be 14 milliseconds. The warping alternations of the glass pane are mostly below 1.5 milliseconds. Using a resiliently suspended inertia movement with alternations of about 3.5 milliseconds and oriented to favor perpendicular light taps provides a consistent and unique signal for the purpose of determining the tap locations.

Referring now to FIG. 5 showing the sensor output signal 86 which starts at the point 88 before the start point 90 of the sensor output signal 92. The threshold level 94 is used to determine the sensor outputs created by the inertia mass resisting the initial rearward thrust by the resilient support attached to the inner glass pane. The signal is valid when it remains above the threshold level 94 for the predetermined signal duration 96 of the inertia mass and its resilient support. The point 88 of the signal 86 crossing the threshold level 94 is the time chosen for the arrival of the light tap at that sensor. The sensor output signal 92 at point 90 would indicate the time of arrival at its sensor location. The time interval is shown by the arrows 97.

Referring now to FIG. 6 wherein is drawn a signal waveform 98 that is more complex, containing both the desired predetermined inertia duration signal with an additional signal 100 superimposed. This is due to the glass pane's natural rearward movement having superimposed vibrations traveling across it while the predetermined signal is occurring from the suspended inertia mass. Even so, the duration of the signal above the threshold level 94 can distinguish the predetermined signal duration 96 of the inertia mass and its resilient support.

Figure 7:
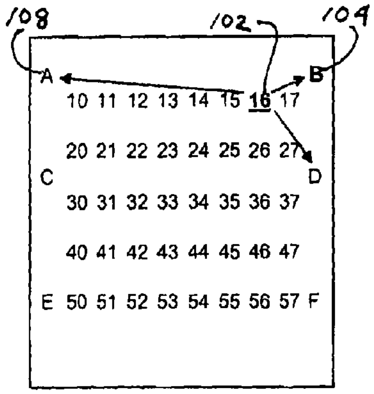
FIG. 7 through FIG. 12 show drawings representing light taps occurring at various product designations on the glass front relative to six sensor placements.

Referring now to FIG. 7 showing a tap occurring at product location 16 102 in proximity to its closest sensor B 104, secondly to its next closest vertical sensor D 106, and thirdly to its horizontal sensor A 108. The first sensor to detect the genuine arrival signal starts a Y (vertically tracking) timer and an X (horizontally tracking) timer which are stopped by the vertical and horizontal sensor signals, respectively. The time intervals recorded as associated with the sensor locations are compared to stored acceptable ones in memory to determine the customer product selected.

Figure 8:
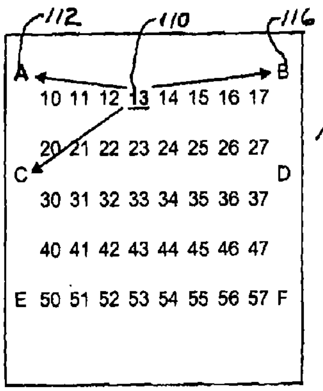

In FIG. 8, when a tap occurs at 13 110, the sensor A 112 signal starts the Y and X timers, and are stopped by the sensor C 114 and B 116 signals, respectively.

Figure 9:
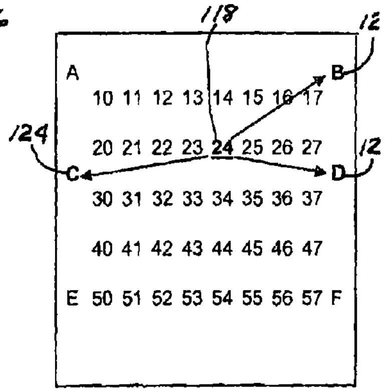

In FIG. 9, when a tap occurs at 24 118, the sensor D 120 signal starts the Y and X timers, and are stopped by the sensor B 122 and C 124 signals, respectively.

Figure 10:
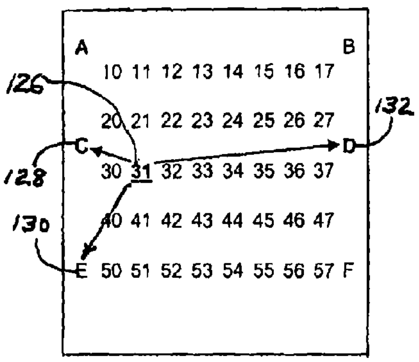

In FIG. 10, when a tap occurs at 31 126, the sensor C 128 signal starts Y and X the timers, and are stopped by the sensor E 130 and D 132 signals, respectively.

Figure 11:
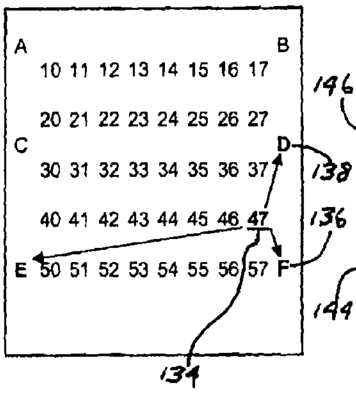

In FIG. 11, when a tap occurs at 47 134, the sensor F 136 signal starts the Y and X timers, and are stopped by the sensor D 138 and E 140 signals, respectively.

Figure 12:
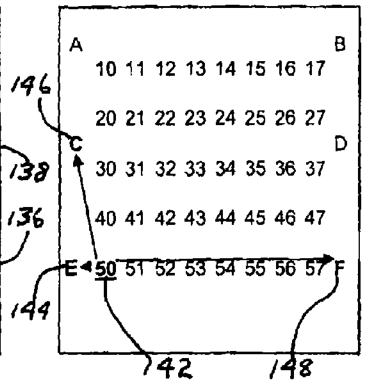

In FIG. 12, when a tap occurs at 50 142, the sensor E 144 signal starts the Y and X timers, and are stopped by the sensor C 146 and F 148 signals, respectively.

In FIG. 13A there is shown a side view of a resilient piezo disc 150 with its lower portion 152 attached to the mounting 154 which is attached to the glass pane 156 and its upper portion 158 pressed against by a projection 160 of the inertia weight 162. The inertia weight 162 is suspended by the flexible support 164 which connects to an attachment 166 on the mounting 154. The piezo disc 150 sensor leads 168 and 170 provide for connection at terminals 172 and 174 respectively. The front view of FIG. 13A is shown in FIG. 13B with corresponding parts having corresponding reference numbers.

A preferred method in FIG. 14A shows a side view of a resilient piezo disc 176 is with its lower portion attached to a mounting 178 which is attached to the glass pane 180 and an inertia weight 182 attached to the upper portion 184 of the resilient piezo disc 176. The sensor leads 186 and 188 connect to the resilient piezo disc 176 and its piezo element 190, respectively. The front view of FIG. 14A is shown in FIG. 14B with corresponding parts having corresponding reference numbers. The dashed lines 192 with arrows 194 indicate the directions of movement of the resilient piezo disc 176 when it bends upon sufficient rearward movement of the mounting 178 and the tendency of the inertia weight 182 to resist movement and thereby flexing the resilient piezo disc 176 to the predetermined rate. The signal developed at the leads 186 and 188 are predominately at a predetermined rate and amplitude as controlled by the inertia weight and the resilient member.

Figure 15:
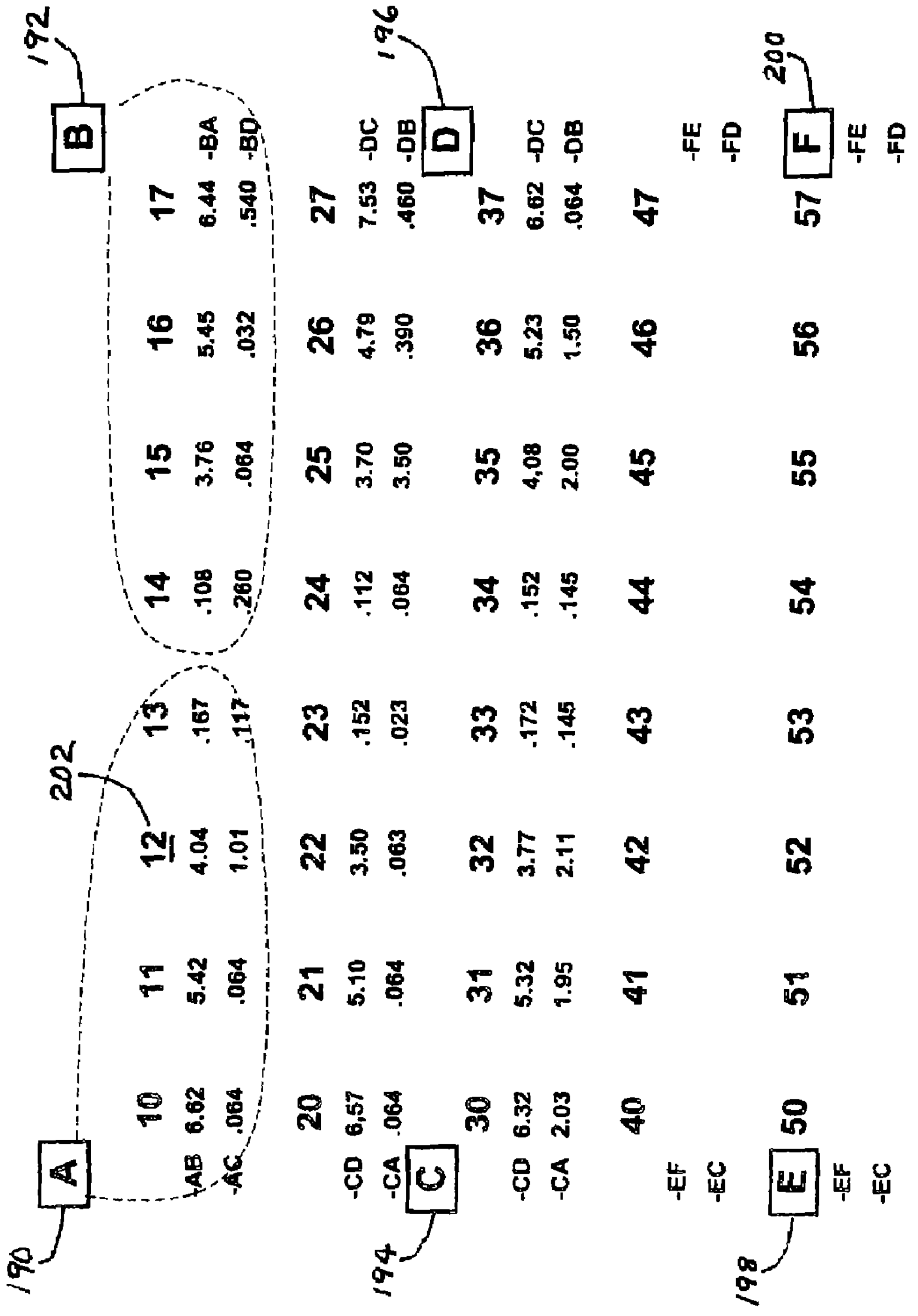
FIG. 15 is a chart showing time intervals in milliseconds, when a light tap occurs at various product designations, according to the principals of FIGS. 7 through 12.

The chart of FIG. 15 shows the relative location of sensors A 190, B 192, C 194, D 196, E 198, capacitive, inductive, hall effect device or optical sensors can be utilized to sense a resiliently suspended inertia mass movement in respect to its attachment to the glass pane. The inertia mass can be suspended by a resilient member portion, or independently weighted against it.

The same methods work very well when only one glass pane is used for viewing items to be selected by a user, such as in a non refrigerated vendor, and is anticipated. Also anticipated is the use of any of the taught methods and apparatus disclosed which would include the optional use of the prior art product entry methods and apparatus.

We claim:

1. A method of selecting a viewable product from within a refrigerated glass front vending machine having an outer transparent glass pane positioned in front of and spaced apart from an inner transparent glass pane, comprising;

providing product identification areas at said glass front for a customer to apply a light tap for selecting a said viewable product;

placing three or more inertia masses, each supported by a first portion of a resilient member, and each said resilient member having its second portion attached to the said inner transparent glass pane at spaced apart locations for reciprocating at a predetermined rate to the said subsequent natural lateral bending movement of said inner transparent glass pane resulting from said light tap on said outer transparent glass pane;

providing each said resilient member with its said inertia mass to reciprocate for one or more predetermined time periods when said light tap on said outer glass pane is at least at a predetermined level;

providing a sensor to produce a signal indicative of the reciprocating movement of each said resilient member;

determining when the said at least one predetermined time period occurs from each said sensor; determining the arrival time of said light tap at said sensor from a predetermined point of the first said at least one predetermined time period;

determining which of said sensors senses the first said arrival time;

determining which of the said sensors senses the second said arrival time;

determining which of the said sensors senses the third said arrival time;

determining at least two said arrival time differences between the said sensors;

determining the selected said product identification area by comparing the said at least two arrival time differences, with the acceptable arrival time differences of each said product identification areas stored in memory; and producing a signal indicating the location of the said light tap representing the said selected said viewable product.

2. The method of claim 1, further comprising the steps of:

determining when a credit deposited by a customer at least equals a price stored for the said selected viewable product;

vending the said selected viewable product; and paying back excess credit when the said credit deposited exceeds the said price stored for the said selected viewable product.

3. The method of claim 1, wherein said sensors are piezo, resistive, capacitive, inductive, or hall effect.

4. The method of claim 1, wherein each said resilient member, is a piezo disc having the said first portion of its resilient disc attached to the said inner glass pane and its said second portion for suspending said inertia mass.

5. The method of claim 4, wherein the said piezo disc is connected to provide the said signal indicative of the said reciprocating at a predetermined rate at each said resilient member.

6. The method of claim 1, wherein determining the said selected product identification area by calculations of time-distance relations of the said at least two said arrival time differences between the said three or more spaced apart locations.

7. The method of claim 1, wherein the space between the said inner glass pane and the said outer transparent glass pane is sealed with Argon Gas, other inert gas, or air.

8. The method of claim 1, further including the step of providing a visual display to indicate the said selected product.

9. The method of claim 1, further including the step of providing an audio sound indication of the said selected product.

10. The method of claim 1, wherein the said resilient members are attached to the said glass panes supporting structure.

11. A method of selecting a viewable product from within a glass front vending machine having a transparent glass pane, comprising;

providing product identification areas at said glass front for a user to apply a light tap for selecting a said viewable product;

placing three or more inertia masses, each supported by a first portion of a resilient member, and each said resilient member having its second portion attached to the said transparent glass pane at spaced apart locations, for reciprocating at a predetermined rate to the said subsequent natural lateral bending movement of said transparent glass pane resulting from said light tap on said transparent glass pane;

providing each said resilient member with its said inertia mass to reciprocate for at least one predetermined time period when said light tap on said glass pane is at least at a predetermined level; providing a sensor to produce a signal indicative of the reciprocating movement at each said resilient member;

determining when the said at least one predetermined time period occurs from each said sensor; determining the arrival time of said light tap at said sensor from a predetermined point of the first said at least one predetermined time period;

determining which of said sensors senses the first said arrival time;

determining which of the said sensors senses the second said arrival time; determining which of the said sensors senses the third said arrival time; determining at least two said arrival time differences between the said sensors;

determining the selected said product identification area by comparing the said at least two arrival time differences, with the acceptable arrival time differences of each said product identification areas stored in memory; and producing a signal indicating the location of the said light tap representing the selected said viewable product.

12. A method of selecting a viewable product from within a refrigerated glass front vending machine having an outer transparent glass pane positioned in front of and spaced apart from an inner transparent glass pane, comprising;

providing product identification areas at said glass front for a customer to apply a light tap for selecting a said viewable product;

placing three or more inertia masses, each supported by a first portion of a resilient member, and each said resilient member having its second portion attached to the said inner transparent glass pane at spaced apart locations for reciprocating at a predetermined rate to the said subsequent natural lateral bending movement of said inner transparent glass pane resulting from said light tap on said outer transparent glass pane.

13. A refrigerated glass front vending machine having viewable products for making a selection and for receiving credit for its purchase and delivery, comprising:

an outer transparent glass pane positioned in front of and spaced apart from an inner transparent glass pane;

product identification areas at said glass front for a customer to apply a light tap for selecting a said viewable product;

three or more inertia masses, each supported by a first portion of a resilient member, and each said resilient member having its second portion attached to the said inner transparent glass pane at spaced apart locations for reciprocating at a predetermined rate to the said subsequent natural lateral bending movement of said inner transparent glass pane resulting from a predetermined level of said light tap on said outer transparent glass pane;

a sensor to produce a signal indicative of the said reciprocating at a predetermined rate of each said resilient member supporting a said inertia mass;

a controller operatively connected to determine when the said at least one predetermined time period occurs from each said sensor signal, to determine the arrival time of said light tap at said sensor from a predetermined point of the first said at least one predetermined time period, to determine which of said sensors senses the first, second, and third said arrival times, to determine at least two said arrival time differences between the said sensors; to determine the selected said product identification area by comparing the said at least two arrival time differences, with the acceptable arrival time differences of each said product identification areas stored in memory; and to produce a signal indicating the location of the said light tap representing the said selected said viewable product, and to dispense the said product when a credit has been determined to at least equal the said selected product.

14. A glass front vending machine having viewable products for making a selection and for receiving credit for its purchase and delivery, comprising:

a transparent glass pane for viewing vendible products;

product identification areas at the transparent glass pane for a customer to apply a light tap for selecting a viewable product;

a sensor to produce a signal indicative of said light tap;

a controller operatively connected to determine when at least one predetermined time period occurs from each said sensor signal, to determine the arrival time of said light tap at said sensor from a predetermined point of the at least one predetermined time period, to determine which of said sensors senses the first, second, and third said arrival times, to determine at least two said arrival time differences between the said sensors; to determine the selected said product identification area by comparing the said at least two arrival time differences, with the acceptable arrival time differences of each said product identification areas stored in memory; and to produce a signal indicating the location of the said light tap representing the said selected said viewable product, and to dispense the said product when a credit has been determined to at least equal the said selected product.

15. A glass front vending machine having viewable products for making a selection and for receiving credit for its purchase and delivery, comprising:

a transparent glass pane for viewing vendible products;

product identification areas at the transparent glass pane for a customer to apply a light tap for selecting a said viewable product;

three or more inertia masses, each supported by a first portion of a resilient member, and each said resilient member having its second portion attached to the said glass pane at spaced apart locations for reciprocating at a predetermined rate to the said subsequent natural lateral bending movement of said glass pane resulting from a predetermined level of said light tap on said glass pane;

a sensor to produce a signal indicative of the said reciprocating at a predetermined rate of each said resilient member supporting a said inertia mass;

a controller operatively connected to determine when the said at least one predetermined time period occurs from each said sensor signal, to determine the arrival time of said light tap at said sensor from a predetermined point of the first said at least one predetermined time period, to determine which of said sensors senses the first, second, and third said arrival times, to determine at least two said arrival time differences between the said sensors; to calculate the said product identification area using the said arrival time differences in a predetermined formula; and to produce a signal indicating the location of the said light tap representing the said selected said viewable product, and to dispense the said product when a credit has been determined to at least equal the said selected product.

* * * * *